United States Patent [19]

Singer et al.

[11] Patent Number: 5,102,681
[45] Date of Patent: Apr. 7, 1992

[54] REDUCED FAT SALAD DRESSING

[75] Inventors: Norman S. Singer, Highland Park, Ill.; Joseph Latella, London; Shoji Yamamoto, Charlottetown, both of Canada

[73] Assignee: John Labatt Limited/John Labatt Limitee, London, Canada

[*] Notice: The portion of the term of this patent subsequent to Mar. 29, 2005, has been disclaimed.

[21] Appl. No.: 569,010

[22] Filed: Aug. 17, 1990

Related U.S. Application Data

[63] Continuation-in-part of Ser. No. 367,261, Jun. 16, 1989, Pat. No. 4,961,953, which is a continuation of Ser. No. 123,955, Dec. 2, 1987, abandoned, which is a continuation-in-part of Ser. No. 606,959, May 4, 1984, Pat. No. 4,734,287.

[51] Int. Cl.$^5$ .............................................. A23L 1/24
[52] U.S. Cl. .................................... 426/589; 426/656; 426/804
[58] Field of Search ........................ 426/589, 656, 804

[56] References Cited

U.S. PATENT DOCUMENTS

| | | |
|---|---|---|
| 2,377,624 | 6/1945 | Gordon . |
| 2,566,477 | 9/1951 | Abrahamczik et al. . |
| 2,602,746 | 7/1952 | Meade . |
| 2,710,808 | 6/1955 | Peebles et al. . |
| 3,066,133 | 11/1962 | Pinckney . |
| 3,300,318 | 1/1967 | Szczesniak et al. . |
| 3,397,997 | 8/1968 | Japikse . |
| 3,507,663 | 4/1970 | Starook et al. . |
| 3,552,981 | 1/1971 | Luksas . |
| 3,594,192 | 7/1971 | Mullen et al. . |
| 3,615,661 | 10/1971 | Ellinger et al. . |
| 3,620,757 | 11/1971 | Chingas et al. . |
| 3,632,350 | 1/1972 | Rattlata . |
| 3,642,490 | 2/1972 | Hawley et al. . |
| 3,642,492 | 2/1972 | Arndt . |
| 3,642,493 | 2/1972 | Arndt . |
| 3,644,326 | 2/1972 | Pien . |
| 3,689,288 | 3/1972 | Duren . |
| 3,708,307 | 1/1973 | Lundstadt . |
| 3,723,407 | 3/1973 | Miller et al. . |
| 3,726,690 | 4/1973 | Schuppner et al. . |
| 3,737,326 | 6/1973 | Basso et al. . |
| 3,757,005 | 9/1973 | Kautz et al. . |
| 3,793,464 | 2/1974 | Rusch . |
| 3,798,339 | 3/1974 | Peng . |
| 3,800,052 | 3/1974 | Inagami et al. . |
| 3,829,592 | 8/1974 | Bratland . |
| 3,842,062 | 10/1974 | Eastman . |
| 3,843,828 | 10/1974 | Arndt . |
| 3,852,503 | 12/1974 | Magnino et al. . |
| 3,853,839 | 12/1974 | Magnino et al. . |
| 3,865,956 | 2/1975 | Fukushima et al. . |
| 3,873,751 | 3/1975 | Arndt . |
| 3,891,777 | 6/1975 | Boyer . |
| 3,891,778 | 6/1975 | Boyer . |
| 3,892,873 | 7/1975 | Kolen et al. . |
| 3,899,605 | 8/1975 | Schaap . |
| 3,914,435 | 10/1975 | Maubois et al. . |
| 3,922,375 | 11/1975 | Dalan et al. . |
| 3,929,892 | 12/1975 | Hynes et al. . |
| 3,930,039 | 12/1975 | Kuiper . |
| 3,930,056 | 12/1975 | Feminella et al. . |
| 3,935,323 | 1/1976 | Feminella et al. . |
| 3,969,534 | 7/1976 | Pavey et al. . |
| 3,978,243 | 8/1976 | Pedersen . |
| 3,982,039 | 9/1976 | Scibelli et al. . |

(List continued on next page.)

FOREIGN PATENT DOCUMENTS

| | | |
|---|---|---|
| 1313085 | 4/1973 | European Pat. Off. . |
| 0076549 | 4/1983 | European Pat. Off. . |
| 1363783 | 8/1974 | United Kingdom . |
| 2063273 | 6/1981 | United Kingdom . |

OTHER PUBLICATIONS

An article entitled *Fortyifying Soft Drinks with Cheese Whey Protein*, by Holsinger et al., pp. 59, 60, 64, and 65, Feb. 1973.

*Primary Examiner*—Donald E. Czaja
*Assistant Examiner*—Evan Federman
*Attorney, Agent, or Firm*—Marshall, O'Toole, Gerstein, Murray & Bicknell

[57] ABSTRACT

The present invention provides a salad dressing formulated with microparticulated protein which serves as a replacement for all or part of the fat and/or oil normally found in a salad dressing.

1 Claim, 1 Drawing Sheet

U.S. PATENT DOCUMENTS

| | | |
|---|---|---|
| 4,007,283 | 2/1977 | Crisan et al. . |
| 4,018,752 | 4/1977 | Buhler et al. . |
| 4,029,825 | 6/1977 | Chang . |
| 4,031,261 | 6/1977 | Durst . |
| 4,031,267 | 6/1977 | Berry et al. . |
| 4,057,655 | 11/1977 | Okada et al. . |
| 4,058,510 | 11/1977 | Concilio-Nolan et al. . |
| 4,072,670 | 2/1978 | Goodnight, Jr. et al. . |
| 4,079,154 | 3/1978 | Yasumatsu . |
| 4,089,987 | 5/1978 | Chang et al. . |
| 4,091,116 | 5/1978 | Edwards et al. . |
| 4,103,037 | 7/1978 | Bodor et al. . |
| 4,103,038 | 7/1978 | Roberts . |
| 4,104,413 | 8/1978 | Wynn et al. . |
| 4,107,334 | 8/1978 | Jolly . |
| 4,113,716 | 9/1978 | Gomi et al. . |
| 4,125,630 | 11/1978 | Orthoefer . |
| 4,137,339 | 1/1979 | Kudo et al. . |
| 4,140,808 | 2/1979 | Jonson . |
| 4,143,174 | 3/1979 | Shah et al. . |
| 4,147,810 | 4/1979 | Kellor . |
| 4,169,160 | 9/1979 | Wingerd et al. . |
| 4,183,970 | 1/1980 | May et al. . |
| 4,186,218 | 1/1980 | Gomi et al. . |
| 4,188,411 | 2/1980 | Kuipers et al. . |
| 4,192,901 | 3/1980 | Yasumatsu et al. . |
| 4,194,018 | 3/1980 | Hodel et al. . |
| 4,194,019 | 3/1980 | Yasumatsu et al. . |
| 4,205,094 | 5/1980 | Baird et al. . |
| 4,209,503 | 6/1980 | Shah et al. . |
| 4,212,893 | 7/1980 | Takahata . |
| 4,217,370 | 9/1980 | Rawlings et al. . |
| 4,218,490 | 9/1980 | Phillips et al. . |
| 4,486,345 | 12/1984 | Callewaert . |
| 4,497,834 | 2/1985 | Barta . |
| 4,497,836 | 2/1985 | Maquardt et al. . |
| 4,500,454 | 2/1985 | Chang . |
| 4,515,825 | 5/1985 | Morar et al. . |
| 4,734,287 | 3/1988 | Singer et al. .......................... 426/41 |
| 4,230,738 | 10/1980 | Shemer et al. . |
| 4,234,620 | 11/1980 | Howard et al. . |
| 4,244,983 | 1/1981 | Baker . |
| 4,247,566 | 1/1981 | Inagami et al. . |
| 4,248,895 | 2/1981 | Stroz et al. . |
| 4,251,562 | 2/1981 | LeGrand et al. . |
| 4,252,835 | 2/1981 | Maerker et al. . |
| 4,259,361 | 3/1981 | Procter . |
| 4,260,636 | 4/1981 | Yasumatsu et al. . |
| 4,265,924 | 5/1981 | Buhler et al. . |
| 4,267,100 | 5/1981 | Chang et al. . |
| 4,271,201 | 6/1981 | Stenne . |
| 4,275,084 | 6/1981 | Ohyabu et al. . |
| 4,278,597 | 7/1981 | Cho et al. . |
| 4,279,939 | 7/1981 | Cho . |
| 4,291,067 | 9/1981 | Buhler et al. . |
| 4,293,571 | 10/1981 | Olofsson et al. . |
| 4,305,964 | 12/1981 | Moran et al. . |
| 4,305,970 | 12/1981 | Moran et al. . |
| 4,307,118 | 12/1981 | Kajs . |
| 4,325,937 | 4/1982 | Remer . |
| 4,325,977 | 4/1982 | Remer . |
| 4,333,958 | 6/1982 | Egnell . |
| 4,340,612 | 7/1982 | Askman et al. . |
| 4,352,832 | 10/1982 | Wood et al. . |
| 4,362,761 | 12/1982 | Chang et al. . |
| 4,379,175 | 4/1983 | Baker . |

REDUCED FAT SALAD DRESSING

CROSS REFERENCE TO RELATED APPLICATIONS

This application is a continuation-in-part of our copending U.S. patent application Ser. No. 07/367,261 filed June 16, 1989, which issued as U.S. Pat. No. 4,961,953 on Oct. 9, 1990, which was a continuation of our U.S. patent application Ser. No. 07/123,955, filed Dec. 2, 1987, now abandoned, which, in turn, was a continuation-in-part of our U.S. patent application Ser. No. 06/606,959 filed May 4, 1984, which issued as U.S. Patent No. 4,734,287 on Mar. 29, 1988.

BACKGROUND

The present invention relates to reduced fat salad dressing compositions which include a microparticulated protein product as described in our allowed U.S. Pat. No. 4,961,953, the entire disclosure of which is incorporated by reference herein.

SUMMARY OF THE INVENTION

The present invention is a reduced fat salad dressing having all or part of the fat and/or oil content normally found in salad dressing replaced with a proteinaceous, water-dispersible, macrocolloid comprising substantially non-aggregated particles of denatured protein having in a dry state a mean diameter particle size distribution ranging from about 0.1 to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state form said macrocolloid having substantially smooth, emulsion-like organoleptic character.

DETAILED DESCRIPTION OF THE INVENTION

Figure 1:
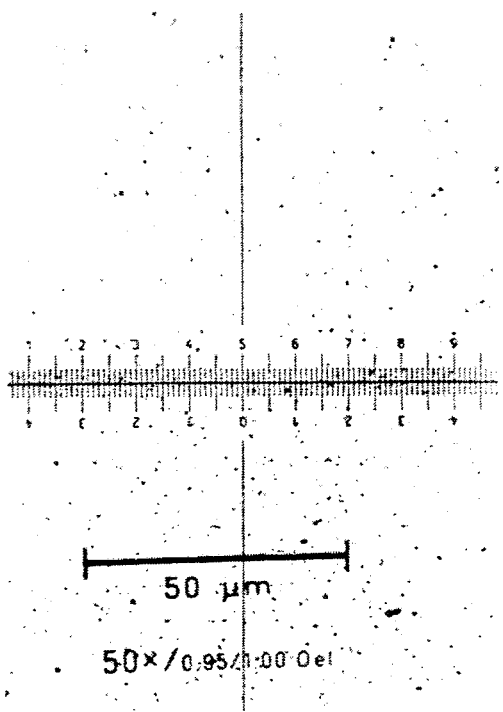
FIG. 1 illustrates a photomicrographic view at 1000× magnification of microparticulated whey protein of the present invention.

The following examples relate to presently preferred methods and procedures for practicing the present invention. Example 1 relates to a preferred method for the production of microparticulated protein from the proteinaceous material present in acidified whey. Example 2 relates to a preferred method for the production of microparticulated protein from casein micelles and the proteinaceous material present in egg white. Example 3 relates to the production of microparticulated protein from the proteinaceous material in whey. Example 4 relates to the preparation of a ranch salad dressing. Example 5 relates to the preparation of a french salad dressing. Example 6 relates to the preparation of a blue cheese salad dressing.

EXAMPLE 1

Microparticulated Protein Produced From Acidified Whey

Microbiologically, aromatically and particulately clean water produced by a reverse osmosis process is added to a sanitary tank.

Commercially available liquid whey protein concentrate is treated by ultrafiltration and evaporation until the concentration of protein is about 50–55% by weight, on a dry basis. The whey protein concentrate is added to the water in the sanitary tank with agitation avoiding aeration through the suction side of a positive displacement pump to achieve a solids concentration of about 37% solids for the mixture.

As this mixture is recirculated back to the sanitary tank, a dilute solution of food acid (acetic, lactic, citric or hydrochloric; alone or in combination) is added through an in-line mixer to lower the pH from about 6.8 to about 4.4±0.05.

The pH adjusted mixture is then rigorously deaerated in a Versator deaerator/homogenizer and bottom fed into a holding tank which is equipped for non-aerating agitation.

The deaerated mix is then pumped (300 lbs/hr) from the holding tank, by a positive displacement pump through an in-line strainer (300 μm cheesecloth) and a mass flow meter, into a plate heat exchanger which heats the mixture to about 165°–180° F., a temperature lower than the target peak temperature which is achieved within a heat and shear generating apparatus ("microcooker"). Flow is manually-controlled based on readings from the in-line flow-meter.

The heated mixture is pumped directly from the plate heat exchanger into the microcooker apparatus as described in U.S. Pat. No. 4,823,396 with the exception that the inlet and outlet ports have been interchanged or exchanged, i.e., the inlet port is disposed where the outlet port is shown in the patent drawing and the outlet port is located at the bottom of the bowl shaped vessel and the temperature of the mixture is raised to about 200° F. within less than 10 seconds under high shear conditions. Rigorous temperature control of the mixture is maintained at 200° F. by means of a cascade control loop. The control loop senses the temperature of the product exiting the microcooker and maintains it at 200° F. by adjusting the temperature of the mixture leaving the plate heat exchanger.

The speed of the rotor in the microcooker is held constant, for example, at about 3715 rpm. At this rpm, the shear rate is about 27,000 reciprocal seconds at the tips of the rotor which has a diameter of approximately 7 inches.

After exiting the microcooker apparatus, the product flows directly into an eccentric scraped surface heat exchange and is cooled with vigorous agitation to less than 130° F. The cooled product then flows through additional heat exchangers (scraped surface of plate type) to reduce its temperature to less than 55° F.

EXAMPLE 2

Microparticulated Protein Produced from Casein Micelles and Egg White

Microbiologically, aromatically and particulately clean water (16.83 wt. %) produced by a reverse osmosis process is heated in a sanitary tank to about 120° F.

Commercially available apple pectin (0.35 wt. %) dry-blended with sugar (5.0 wt. %) to assure its complete dispersion and is then added to the water in the sanitary tank by means of a high shear solid/liquid Triblender mixer. This mixture is held at about 120°–140° F. with agitation for about 5 minutes to assure hydration and dissolution of the pectin. The mixture is then cooled to less than about 100° F.

Liquid egg white is ultrafiltered using membrane filters having a molecular weight cut-off of about 10,000. The ultrafiltration reduces the total volume of the liquid egg white by about 50% and effectively doubles the protein content and halves the sodium content of the egg white. The treated egg white (55 wt. %) is added to the pectin solution through the suction side of a positive displacement pump with controlled agitation to avoid aeration.

Condensed skim milk (22.65 wt. %) is then added to the mixture through the suction side of a positive displacement pump.

As this mixture is recirculated back to the sanitary tank, a dilute solution of food acid (0.17 wt. %) (acetic, citric, lactic or hydrochloric; alone or in combination) is added through an in-line mixer to lower the pH from about 7 to about 6.20±0.05.

The pH adjusted mix is then rigorously deaerated in a Versator deaerator and bottom-fed into a holding tank which is equipped for non-aerating agitation.

The deaerated mixture is then pumped (600 lb/hr) from the holding tank, by a positive displacement pump through an in-line strainer (300 μm cheesecloth) and a mass flow meter into a plate heat exchanger which heats the mixture to about 165° F., a temperature lower than the target peak temperature which is achieved within the microcooker apparatus described in Example 1. At this lower temperature no coagulate will have developed. Flow is manually-controlled based upon readings from the in-line flow-meter.

The heated mixture is pumped directly from the plate heat exchanger into the microcooker apparatus and the temperature of the mixture is raised to about 185° F. within less than about 10 seconds under high sheer conditions. Rigorous temperature control is maintained over the temperature of the mixture in the microcooker apparatus by a cascade control loop. The control loop senses the temperature of a product exiting the microcooker and holds the temperature constant by regulating the temperature of the mixture leaving the plate heat exchanger.

The speed of the rotor in the microcooker is held constant at about 5400 rpm. At this rpm, the shear rate is about 40,000 reciprocal seconds at the tips of the rotor which has a diameter of approximately 7 inches.

After exiting the microcooker apparatus, the product flows directly into an eccentric scraped surface heat exchanger and is cooled with vigorous agitation to less than 130° F. The cooled product then flows through additional heat exchangers (scraped surface or plate type) to reduce its temperature to less than 55° F.

EXAMPLE 3

Microparticulated Protein Produced From Whey

Commercially available liquid whey is treated by ultrafiltration and evaporation to give a mixture having about 42% by weight solids and about 50%–55% by weight protein, on a dry basis. The resulting whey protein concentrate is deaerated in a Versator deaerator and bottom fed into a sanitary tank equipped for a nonaerating agitation.

The deaerated mixture is then pumped (600 lbs/hr), by a positive displacement pump through an in-line strainer (300 μm cheesecloth), a mass flow meter and plate heat exchanger which raises the temperature of the mixture to about 170° F., into a heated holding device.

The heated holding device includes two concentric scraped surface heat exchangers connected in series. Each heat exchanger provides a hold time of about 3.6 minutes at a flow rate of about 300 lbs/hr. Both of these heat exchangers are heated to maintain the hold temperature set by the plate heat exchanger.

The mixture is then pumped from the holding device to an eccentric scraped surface heat exchanger. This scraped surface heat exchanger cools the mixture to a temperature of about 165° F., a temperature lower than the target peak temperature inside a heat and high shear generating apparatus (microcooker). The mixture then flows directly into the microcooker apparatus as described in Example 1 and the temperature of the mixture is raised to 200° F. within 10 seconds under high shear conditions. Rigorous temperature control at 200° F. is maintained in the microcooker by a cascade control loop. The control loop senses the temperature of a product exiting the microcooker and holds the temperature constant by regulating the temperature of the mixture leaving the eccentric scraped surface heat exchanger.

The speed of the rotor in the microcooker is held constant at about 5200 rpm. At this rpm, the shear rate is about 40,000 reciprocal seconds at the tips of the rotor which has a diameter of approximately 7 inches.

After exiting the microcooker apparatus, the product flows directly into an eccentric scraped surface heat exchanger and is cooled with vigorous agitation to less than 130° F. The cooled product then flows through an additional heat exchanger (scraped surface or plate type) to reduce its temperature to less than 55° F.

EXAMPLE 4

Preparation of a Ranch Salad Dressing

A ranch salad dressing is prepared from the ingredients listed in Table 1.

TABLE 1

| Ranch Salad Dressing | |
|---|---|
| Ingredients | Wt. % of Composition |
| Water | 15–22 |
| Cellulose gel | 1–4 |
| Gums/Stabilizer | 1–4.5 |
| Maltodextrin | 2–6 |
| Monosodium glutamate | 0–0.3 |
| Postassium Sorbate | 0.05–0.3 |
| Sodium Benzoate | 0.05–0.3 |
| EDTA | 0–0.006 |
| Sodium Acetate | 0.2–1.0 |
| Vinegar (100 Gr.) | 7–10 |
| Milk and Milk Solids | 20–40 |
| Pectin | 0.2–0.6 |
| Corn Syrup Solids | 2–6 |
| Salt | 1.3–2.0 |
| Microparticulated Protein | 10–20 |
| Flavor | 1.0–10 |
| Oil | 2–7 |
| Antioxidant | 0–0.002 |
| Spice | 0.3–1.0 |

In the above ingredient list gums and stabilizers may include unmodified or modified food starch, xanthan, sodium and propylene glycol alginate, locust bean, guar gum, or carboxymethylcellulose; milk and milk solids may include buttermilk, skim milk or nonfat dry milk; and flavor may be combinations of natural buttermilk, dairy, cream, fat or savory flavors such as oinion and garlic.

To prepare a ranch salad dressing a starch base was made by adding maltodextrin (American Maize LODEX 5 maltodextrin 4.4%) cellulose gel (FMC AVICEL PH 105 cellulose gel, 1.0%, AVICEL RC 591 cellulose gel 0.55%), xanthan gum (Kelco, KELTROL T xanthan gum, 0.06%) to water (14.4%). The additional dry ingredients corn syrup solids (Staley, STANDRI 20 corn syrup solids, 4.8%), potassium sorbate (Tri-K, 0.05%) Sodium benzoate (Tri-K, 0.05%), EDTA (Tri-K, 0.006%), monosodium glutamate (Saratoga Specialty, 0.2%) and Sodium acetate (Fisher Chemical, 0.3%) were added to the starch base and vinegar (Fleischmann corn vinegar, 7%) was added to the base mixture. The base mixture was heated to 195° F. for one minute and then cooled to 70° F. before it is combined with a premade milk mixture.

The premade milk mixture was prepared by mixing buttermilk (20%), skim milk (10%), skim milk solids (2.7%) and pectin (Hercules, JMJ pectin, 0.35%) with the microparticulated protein (prepared according to the process described in example 3, 15%) and then blending the mixture for 30 minutes. The stabilized milk mixture was combined with salt (International Salt Co., ALBERGER FINE FLAKE salt 1.8%) and a prepared flavor mixture of corn oil (5.1%), SUSTANE 20 antioxidant (0.2%), natural garlic (0.1%, MFU-703, Hasegawa) flavor blend (0.3%), fat flavor (R-11773 Givaudun), Starter Distillate replacer 15x (0.2%), water (5.8%) super critcal egg yolk (0.2%) KELTROL T xanthan gum (0.05%), mustard (0.05%, MFU-705), and sour cream flavor, (0.8%, MFU-705 Hasagawa) that had been homogenized at 5000 psi. The flavored milk mixture was heated to 165° F. and then cooled to 70° F. The prepared starch base mixture and the flavored milk mixture were combined and homogenized, if necessary, to give a ranch dressing that was flavored with the addition of spice (Saratoga Specialty parsley, 0.02%) and black pepper (0.06%) before being packaged according to known procedures.

EXAMPLE 5

French Salad Dressing

A french salad dressing is prepared from the ingredients listed in Table 2.

TABLE 2

| French Salad Dressing | |
|---|---|
| Ingredients | Wt. % of Composition |
| Water | 20–55 |
| Starch | 0.5–3.0 |
| Sugar | 10–30 |
| Salt | 1.5–4.0 |
| Color | 0.1–0.5 |
| Gum/Stabilizer | 0.5–3.0 |
| Spice | 0.5–3.0 |
| Flavor | 0.5–2.0 |
| Citric Acid | 0.1–1.0 |
| Potassium Sorbate | 0.05–.03 |
| Sodium Benzoate | 0.05–0.3 |
| EDTA | 0–0.006 |
| Tomato Paste | 2–15 |
| Microparticulated Protein | 5–20 |
| Pectin | 0.01–0.1 |
| Flavor | 0.1–3.0 |
| Oil | 2–5 |
| Antioxidant | 0–0.01 |
| Vinegar (100 Gr.) | 5–15 |

In the above ingredient list starch may be unmodified or modified food starch and gum and stabilizer may be xanthan, sodium and propylene glycol alginate, locust bean, guar gum, or carboxymethylcellulose.

To prepare a french salad dressing two types of starch (Staley THERMO FLO starch, 0.42% and Staley DRESSN 400 starch 1.0%) were added to water (20%) and the aqueous mixture was heated to 195° F. for one minute. The heated mixture was cooled to 70° F. and combined with additional water (25.4857%), annatto WSA (Biocon, 0.0005%), celery flavor (Quest 0.005%), paprika oleoresin (Kalsec, 0.1%) and mouthfeel flavor (0.15%) and then combined with sugar (C&H granular sugar, 13.72%), KELTROL T xanthan gum (Kelco 0.405%), KELCOLOID LVP gum (Kelco, 0.155%), LODEX 5 starch (Amaizo, 4.952%), paprika powders (McCormick, 0.404%), salt ALBERGE FINE FLAKE salt, 2.754%), potassium sorbate (0.05%) sodium benzoate (0.05%), EDTA (Tri-K, 0.006%) and mustard powder (Baltimore spice, 0.09%). Tomato paste (Contadina, 3.54%), mustard (Kraft 0.4%) and polysorbate 60 (Emulsion Engineering 0.05%) were added to the flavored mixture and the combined aqueous mixture was then added to a prepared mixture of pectin (Hercules, JMJ pectin, 0.03%), microparticulated protein (prepared according to the process described in Example 3, 10%), and water (3.33%) that had been blended for 30 minutes. This base was combined with oil (ADM corn oil, 2%), SUSTANE Quantioxidant (UOP, 0.01%), black pepper oil (Fleton 0.002%), and mustard oil (0.0003%) mixed with white vinegar (Fleishchmann, 85%) and corn vinegar (Fleischmann, 1.0%) and then packed according to known methods.

EXAMPLE 6

Blue Cheese Salad Dressing

A blue cheese salad dressing is prepared from the ingredients listed in Table 3.

TABLE 3

| Blue Cheese Salad Dressing | |
|---|---|
| Ingredients | Wt. % of Composition |
| Cultured lowfat Buttermilk | 0–50.00 preferred 30.0–50.0 |
| Milk solids | 0–5.0 preferred 1.0–4.0 |
| Pectin | 0.3–1.0 preferred 0.4–0.7 |
| Microparticulated Protein | 28.5 |
| Water | 0–43.0 preferred 0–.18.0 |
| Gum | 0–1.0 |
| Salt | 0.5–2.0 preferred 1.0–2.0 |
| Starch | 1.0–2.0 preferred 1.2–1.7 |
| Maltodextrin/ Corn Syrup Solids | 1.0–7.0 preferred 3.0–6.0 |
| Monosodium glutamate | 0–1.0 preferred 0.1–0.5 |
| Spice | 0–0.2 |
| Potassium Sorbate | 0.01–0.3 preferred 0.05–0.3 |
| Sodium Benzoate | 0.01–0.3 preferred 0.05–0.3 |
| Flavor | 0.5–4.0 |
| Egg, whole | 0.5–5.0 preferred 3.0–5.0 |
| Vinegar (100 g)/lemon juice | 5.0–7.0 |

To prepare a Blue Cheese salad dressing cultured lowfat buttermilk (48.35%) was mixed with nonfat dry milk (1.0%) and pectin (JMJ Hercules 0.5%). This mixture was added to the microparticulated protein (25%, prepared according to the procedures of Example 3). The combined mixture was mixed with a pre-blended mixture of the dry ingredients: KELCOLOID LVP gum (Kelco, 0.12%), KELTROL T xanthan gum (Kelco, 0.13%), starch (Staley DRESSN 400 starch, 1.54%), salt (1.6%), corn syrup solids (STAN-DRI 20 Corn Syrup Solids, 3.9%), maltodextrin (LODEX 5 maltodextrin, Amaizo 4.76%), monosodium glutamate (0.2%), black pepper (0.85%), potassium sorbate (0.05%), sodium benzoate (0.05%), blue cheese powder (Fidco 0.5%) and natural blue flavor (Fla. of N. Am. 824203, 1.3%). Pasteurized whole frozen egg (4.0%) was added to the flavored mixture and the mixture was then combined with vinegar (100 Gr., 6.0%) and lemon juice (Sunkist, 0.5%). The mixture was heated to 192° F. for one minute, cooled to 70° F., and packaged according to well known procedures.

Numerous modifications and variations in practice of the invention are expected to occur to those skilled in the art upon consideration of the foregoing descriptions of preferred embodiments thereof. Consequently, only such limitations should be placed upon the scope of the invention as appear in the appended claims.

What is claimed is:

1. A reduced fat salad dressing, wherein the improvement comprises replacing all or part of the normal fat and/or oil content of the salad dressing with a proteinaceous, water-dispersible, macrocolloid comprising substantially non-aggregated particles of denatured protein having in a dry state a mean diameter particle size distribution ranging from about 0.1 microns to about 2.0 microns, with less than about 2 percent of the total number of particles exceeding 3.0 microns in diameter, and wherein the majority of the said particles are generally spheroidal as viewed at about 800 power magnification under a standard light microscope, the particles in a hydrated state form said macrocolloid having substantially smooth, emulsion-like organoleptic character.

* * * * *